(12) United States Patent
Toshima et al.

(10) Patent No.: US 6,503,560 B2
(45) Date of Patent: Jan. 7, 2003

(54) COMPOSITE NICKEL FINE POWDER AND METHOD FOR PREPARING THE SAME

(75) Inventors: Yoshiharu Toshima, Yamaguchi (JP); Takayuki Araki, Yamaguchi (JP); Yasuhide Yamaguchi, Yamaguchi (JP); Takao Hayashi, Yamaguchi (JP); Hiroyuki Shimamura, Tokyo (JP)

(73) Assignee: Mitsui Mining and Smelting Co., Ltd, Tokyo (JP)

(*) Notice: Subject to any disclaimer, the term of this patent is extended or adjusted under 35 U.S.C. 154(b) by 0 days.

(21) Appl. No.: 09/944,164

(22) Filed: Sep. 4, 2001

(65) Prior Publication Data

US 2002/0055002 A1 May 9, 2002

Related U.S. Application Data

(62) Division of application No. 09/320,837, filed on May 26, 1999, now abandoned.

(30) Foreign Application Priority Data

May 29, 1998 (JP) ............................................. 10-165893
Mar. 31, 1999 (JP) ............................................. 11-092122

(51) Int. Cl.⁷ ................................................. B05D 7/00
(52) U.S. Cl. ........................ 427/216; 427/212; 427/214; 427/217; 428/403
(58) Field of Search ................................. 427/212, 215, 427/216, 217, 242; 428/328, 403, 404, 701, 702

(56) References Cited

U.S. PATENT DOCUMENTS

| | | | |
|---|---|---|---|
| 4,578,114 A | | 3/1986 | Rangaswamy et al. |
| 5,126,915 A | * | 6/1992 | Pepin et al. ................. 361/304 |
| 5,763,085 A | * | 6/1998 | Atarashi et al. ............. 428/403 |
| 5,871,840 A | | 2/1999 | Asada et al. |
| 6,007,743 A | | 12/1999 | Asada et al. |

FOREIGN PATENT DOCUMENTS

| | | |
|---|---|---|
| EP | 487272 | 5/1992 |
| EP | 834368 | 4/1998 |
| EP | 834370 | 4/1998 |
| EP | 916438 | 5/1999 |

* cited by examiner

*Primary Examiner*—Michael Barr
*Assistant Examiner*—Rebecca A. Blanton
(74) *Attorney, Agent, or Firm*—Young & Thompson

(57) ABSTRACT

The composite nickel fine powder includes surface-oxidized nickel fine particles and at least one member selected from the group consisting of oxides and complex oxides of at least one metal element having an atomic number ranging from 12 to 56 or 82 and belonging to Group 2 to 14 of the Periodic Table on the surface of the surface-oxidized nickel fine particles.

3 Claims, No Drawings

COMPOSITE NICKEL FINE POWDER AND METHOD FOR PREPARING THE SAME

This application is a division of application Ser. No. 09/320,837, filed on May 26, 1999, now abandoned, the entire contents of which are hereby incorporated by reference.

BACKGROUND OF THE INVENTION

1. Field of the Invention

The present invention relates to composite nickel fine powder which has characteristic properties suitably used as a material for preparing an internal electrode of laminated ceramic condensers, which is excellent in resistance to oxidation of metal nickel and resistance to diffusion of nickel oxide, in particular, during binder-removal, as well as in thermal shrinkage properties, which can accordingly prevent the occurrence of delamination and the formation of cracks when manufacturing a large-sized laminated ceramic condenser, and which permits the production of a thin, small-sized multilayered ceramic condenser comprising ceramic dielectric layers and internal electrodes, without impairing the dielectric properties and electric properties thereof, and to a method for preparing the composite fine powder.

2. Description of the Prior Art

A laminated ceramic condenser is produced by alternatively putting ceramic dielectric materials and internal electrodes in layers, attaching them by applying pressure and then unifying them by firing. In this respect, an internal electrode for such a laminated ceramic condenser is in general produced by forming metal fine powder as a material for the internal electrode into a paste, printing a layer of the paste on a ceramic substrate, putting a plurality of these printed substrates in layers, thereafter attaching them to one another with pressing and heating to give a unified product and finally heating and firing in a reducing atmosphere. As materials for such an internal electrode, there have been used, for instance, platinum and palladium, but there has recently been developed and advanced a technique in which base metals such as nickel are used in place of precious metals such as platinum and palladium.

When using metallic nickel fine powder as an internal electrode material, however, it has a tendency to undergo rapid thermal shrinkage at a temperature higher than about 400 to 500° C., although the tendency depends on the particle size of the powder. For this reason, if fine powder of metal nickel is used as an internal electrode material, a unified product such as that described above is liable to cause delamination and/or crack-formation during firing the same because of the difference between the ceramic substrate and the layer of the metal nickel fine powder in thermal shrinkage characteristics and this has become a serious problem.

To solve these problems, the inventors of this invention have developed a technique for improving the thermal shrinkage characteristics of the metal nickel fine powder by incorporating magnesium and/or calcium into metal nickel fine particle in an amount falling within a specific range and already filed a patent application (Japanese Patent Application Serial No. Hei 9-342793). This technique permits the inhibition of the foregoing rapid thermal shrinkage at a temperature higher than about 400 to 500° C., which has been observed for the conventional metal nickel fine powder and can shift the starting temperature of such rapid thermal shrinkage to a higher temperature side in proximity to the range of from about 600 to 700° C.

However, the rapid thermal shrinkage-initiating temperature of the internal electrode material should desirably be shifted to the more higher temperature side in order to prevent the occurrence of delamination and/or the formation of cracks during firing. This is because the firing temperature used for preparing a laminated ceramic condenser may vary depending on the ingredients of ceramic dielectric materials, but that for the barium titanate ceramic dielectrics in general ranges from about 1200 to 1400° C.

Moreover, when firing is carried out while a ceramic substrate is brought into contact with a metal, the metal is in general oxidized and the resulting metal oxide has a diffusion coefficient higher than that of the ceramic substrate. Accordingly, diffusion easily occurs, at the grain boundaries, from the metal oxide phase having a higher diffusion coefficient to the ceramic phase having a lower diffusion coefficient.

More specifically, when using a paste containing conventional metal nickel fine particles, a part of the metal nickel of the fine particle is oxidized and the resulting nickel oxide diffuses into a ceramic dielectric material. As a result, a part of the internal electrode to be formed has a tendency to disappear, defects are formed in the internal electrode and a part of the ceramic dielectric layer has a tendency to damage its dielectric characteristics due to the formation of ferrite. Accordingly, it has been quite difficult to produce a thin, small-sized laminated ceramic condenser which comprises layers of a ceramic dielectric material and internal electrode layers, without impairing the dielectric characteristics and electric properties thereof.

SUMMARY OF THE INVENTION

As has been discussed above in detail, it would be very important that the metal nickel fine powder as a material for preparing a paste used for the preparation of a laminated ceramic condenser must be able to prevent the oxidation of metal nickel of the fine powder and any diffusion of nickel oxide into a ceramic substrate during firing and simultaneously to shift the rapid thermal shrinkage-starting temperature of the metal nickel fine powder to the more higher temperature side so that the thermal shrinkage curve of the nickel fine powder approaches that of the ceramic substrate.

Accordingly, it is an object of the present invention to provide composite nickel fine powder which has characteristic properties suitable for use as a material for preparing an internal electrode of laminated ceramic condensers, which is excellent in resistance to oxidation of metal nickel and resistance to diffusion of nickel oxide, in particular, during the binder-removal stage, which has a thermal shrinkage curve approximately identical to that of the ceramic substrate, which can accordingly prevent the occurrence of delamination and the formation of cracks when manufacturing a large-sized laminated ceramic condenser, and which permits the production of a thin, small-sized multilayered ceramic condenser comprising ceramic dielectric layers and internal electrodes, without impairing the dielectric characteristics and electric properties thereof.

Another object of the present invention is to provide a method for preparing such composite nickel fine powder.

The inventors of this invention have conducted intensive studies to accomplish the foregoing objects, have found that composite nickel fine powder having the foregoing characteristic properties can be obtained by fixing an oxide and/or a complex oxide of a specific metal element to the surface of metal nickel fine particles and that such composite nickel fine powder can be prepared by a wet-carrying process, a dry-carrying process or a semi-dry-carrying process and thus have completed the present invention on the basis of these findings.

According to a first aspect of the present invention, there is provided composite nickel fine powder which is characterized in that at least one member selected from the group consisting of oxides and complex oxides which comprise at least one metal element having an atomic number ranging from 12 to 56 or 82 and belonging to Group 2 to 14 of Periodic Table is carried on the surface of metal nickel fine particles.

According to another aspect of the present invention, there is provided a method for preparing composite nickel fine powder which comprises the steps of adding an aqueous solution containing at least one member selected from the group consisting of water-soluble salts of metal elements each having an atomic number ranging from 12 to 56 or 82 and belonging to Group 2 to 14 of Periodic Table to a slurry containing metal nickel fine particles or metal nickel fine particles whose surface is oxidized; and then adjusting the pH of the mixture with an acid or an alkali to thus carry the metal oxide and/or complex oxide derived from the water-soluble salt on the surface of the metal nickel fine particles.

According to a further aspect of the present invention, there is also provided a method for preparing composite nickel fine powder which comprises the steps of temporally carrying at least one member selected from the group consisting of ultrafine particles of oxides and complex oxides containing at least one metal element having an atomic number ranging from 12 to 56 or 82 and belonging to Group 2 to 14 of Periodic Table on the surface of metal nickel fine particles or metal nickel fine particles whose surface is oxidized and colliding the nickel fine particles temporally carrying the ultrafine particles adhered thereto with each other or other objects to thus carry the ultrafine particles on the surface of the metal nickel fine particles.

According to a still another aspect of the present invention, there is provided a method for preparing composite nickel fine powder which comprises the steps of mixing, with heating, a suspension containing at least one member dispersed therein and selected from the group consisting of ultrafine particles of oxides and complex oxides containing at least one metal element having an atomic number ranging from 12 to 56 or 82 and belonging to Group 2 to 14 of Periodic Table with metal nickel fine particles or metal nickel fine particles whose surface is oxidized; removing the medium of the suspension to thus temporally carry the ultrafine particles on the surface of the metal nickel fine particles; and colliding the nickel fine particles temporally carrying the ultrafine particles adhered thereto with each other or other objects to thus carry the ultrafine particles on the surface of the metal nickel fine particles.

DESCRIPTION OF THE PREFERRED EMBODIMENTS

The composite nickel fine powder according to the present invention comprises metal nickel fine particles and at least one member selected from the group consisting of oxides and complex oxides containing at least one metal element having an atomic number ranging from 12 to 56 or 82 and belonging to Group 2 to 14 of Periodic Table, the latter being carried on the surface of the metal nickel fine particles. Therefore, the composite nickel fine powder of the present invention has thermal shrinkage characteristics quite similar to those observed for the ceramic substrate and thus permits prevention of the occurrence of delamination and/or the formation of cracks in the production of a large-sized laminated ceramic condenser. In addition, the composite nickel fine powder has excellent resistance to oxidation and resistance to diffusion during the binder-removal stage and accordingly, permits the production of a thin, small-sized multilayered laminated ceramic condenser which comprises ceramic dielectric materials and internal electrodes, without damaging the dielectric characteristics and electric properties of the condenser.

When producing a thin, small-sized multilayered laminated ceramic condenser which comprises ceramic dielectric materials and internal electrodes, without damaging the dielectric characteristics and electric properties of the condenser, while using a paste containing the composite nickel fine powder of the present invention to thus sufficiently prevent the oxidation of the metal nickel of the fine powder and any diffusion of nickel oxide into the ceramic dielectric layer, observed during the binder-removal stage, or to prevent any damage of the internal electrodes due to disappearance of a part of the internal electrode to be formed and partial loss of the function of the ceramic dielectric layer, the composite nickel fine powder of the present invention preferably comprises metal nickel fine particles and at least one member selected from the group consisting of oxides and complex oxides containing at least one metal element having an atomic number ranging from 12 to 56 or 82 and belonging to Group 2 to 7 or 13 to 14 of Periodic Table and the composite nickel fine powder more preferably comprises metal nickel fine particles and at least one member selected from the group consisting of oxides and complex oxides containing at least one metal element having an atomic number ranging from 12 to 56 or 82 and belonging to Group 2, 3, 4, 7, 13 or 14 of Periodic Table, which is carried on the surface of the metal nickel fine particles.

Furthermore, it is most preferred to use composite nickel fine powder comprising metal nickel fine particles and at least one member selected from the group consisting of oxides of metal elements belonging to Group 2 of Periodic Table, Y, Zr, Al and Si, which is carried on the surface of the metal nickel fine particles.

As the foregoing composite oxides, there may be used in the present invention a variety of composite oxides including the foregoing ones and those listed below.

The composite nickel fine powder of the present invention, when used as a material for the internal electrodes of laminated ceramic condensers, may be those obtained by adhering, to the surface of the metal nickel fine particles, at least one member selected from oxides and complex oxides such as those listed above and at least one member selected from the group consisting of oxides of lanthanum series.

The composite nickel fine powder of the present invention, when used as a material for the internal electrodes of laminated ceramic condensers, preferably comprises metal nickel fine particles and at least one member selected from the group consisting of complex oxides represented by the following general formula:

$$Ba_mX_{1-m}Ti_nZ_{1-n}O_3$$

(in the formula, X represents Sr, Ca, Mg or Pb; Z represents Zr, Y, Sn or Ge; m is a number ranging from 0 to 1; and n is a number ranging from 0 to 1), the complex oxide being carried on the surface of the metal nickel fine particles. In this respect, the foregoing complex oxides may be used alone or in any combination of at least two of them or the complex oxide may further comprise, as a minor optional component, at least one member selected from the group consisting of, for instance, the foregoing variety of oxides, oxides of lanthanoid elements, bismuth oxide and tantalum oxide.

The foregoing oxides and complex oxides may be, for instance, MgO, CaO, SrO, BaO, ZnO, $Al_2O_3$, $Ga_2O_3$, $Y_2O_3$, $SiO_2$, $TiO_2$, $ZrO_2$, $Cr_2O_3$, $MnO_2$, $Mn_3O_4$, $Nb_2O_5$, $BaTiO_3$, $CaTiO_3$, $SrTiO_3$, $BaZrO_3$, $CaZrO_3$, $SrZrO_3$, $(Mg, Ca)TiO_3$, $(Ba, Ca)(Ti, Zr)O_3$, $PbTiO_3$, $Pb(Zr, Ti)O_3$, $(Pb, Ca)TiO_3$, $MgAl_2O_4$ and $BaTi_4O_3$, which can be used in combination. Moreover, these oxides and complex oxides may be doped with oxides of, for instance, Nb, W, La, Y and Mo.

The foregoing oxides of lanthanoid elements may be, for instance, $Nd_2O_3$, $Sm_2O_3$, $Dy_2O_3$, $Er_2O_3$ and $Ho_2O_3$.

The composite nickel fine powder or fine particles of the present invention, when used in the form of a paste for producing an internal electrode of laminated ceramic condensers, preferably have a particle size of not more than 5 $\mu$m and more preferably not more than 1 $\mu$m.

In addition, the total amount of the foregoing at least one member selected from the group consisting of the foregoing oxides and complex oxides to be carried on the metal nickel fine particle preferably ranges from 0.05 to 10% by weight, more preferably 0.5 to 10% by weight and particularly preferably 1 to 10% by weight on the basis of the total weight of the composite nickel fine powder. This is because if the total amount of the carried oxides and/or complex oxides is less than 0.05% by weight, the effect of the oxides and/or complex oxides is apt to be insufficient, while if it exceeds 10% by weight and such composite nickel fine powder is used as a material for producing an internal electrode of laminated ceramic condensers, these oxide may adversely affect the dielectric characteristics of the resulting condenser.

The metal nickel fine particles or the metal nickel fine particles whose surface is oxidized, which are used in the method of the present invention, may be prepared by either a dry process such as the vapor phase hydrogen-reduction with nickel salt vapor or a wet process wherein metal nickel fine particles are precipitated from an aqueous solution containing a nickel salt under specific conditions through reduction with a reducing agent. When the composite nickel fine powder of the present invention is used in the form of a paste for producing an internal electrode of laminated ceramic condensers, the metal nickel fine particles to be used preferably have a particle size of not more than 5 $\mu$m and more preferably not more than 1 $\mu$m.

The composite nickel fine powder according to the present invention may be prepared by a wet-carrying process or a dry-carrying process or further a semi-dry-carrying process which comprises the steps of mixing an aqueous suspension of ultrafine particles of a metal oxide or complex oxide with metal nickel fine particles to thus carry the ultrafine particles on the surface of the metal nickel fine particles and then drying the ultrafine particle-carrying metal nickel fine particles.

If the composite nickel fine powder of the present invention is prepared by the wet-carrying process, an aqueous solution containing at least one member selected from the group consisting of water-soluble salts of metal elements each having an atomic number ranging from 12 to 56 or 82 and belonging to Group 2 to 14 of Periodic Table to a slurry containing metal nickel fine particles or metal nickel fine particles whose surface is oxidized, followed by adjusting the pH of the mixture with an acid or an alkali to thus carry the metal oxide and/or complex oxide derived from the water-soluble salt on the surface of the metal nickel fine particles.

If the composite nickel fine powder of the present invention is prepared by the wet-carrying process, the metal nickel fine particles as a raw material may be those prepared by either a dry process or a wet process. In this respect, the composite nickel fine powder may be prepared by easy and integrated wet processing operations at a low cost by preparing metal nickel fine particles as a raw material according to a wet process discussed above, optionally lightly oxidizing the surface of the metal nickel fine particles with an appropriate oxidizing agent through a wet process and then carrying out the method for preparing the composite nickel fine powder according to the wet-carrying process. In this connection, when using the metal nickel fine particles whose surface is lightly oxidized with an appropriate oxidizing agent in advance, the foregoing oxides and/or complex oxides are liable to be easily formed on the surface of the metal nickel fine particles.

The foregoing water-soluble salts used in the composite nickel fine powder-production method of the present invention, which is carried out according to the wet-carrying process, are not restricted to any specific one inasmuch as they are soluble in water and can be converted into water-insoluble oxides or complex oxides. Examples thereof are halides, nitrates, sulfates, oxalates, oxides, and alkali metal salts such as aluminates and silicates, of the foregoing metal elements.

When the composite nickel fine powder-production method of the present invention is carried out by the wet-carrying process, the pH adjusting agent may be selected from either acids or alkalis depending on the kinds of the foregoing water-soluble salts used, but the kinds of these acids and alkalis used are not limited to any specific one. For instance, a sodium hydroxide aqueous solution can be used if the oxides in the parenthesis are formed using the following water-soluble salt:

titanium sulfate ($TiO_2$); manganese sulfate ($MnO_2$); chromium chloride ($Cr_2O_3$); yttrium chloride ($Y_2O_3$); zirconium chloride oxide ($ZrO_2$).

Moreover, dilute sulfuric acid may be used if the oxides in the parenthesis are formed using the following water-soluble salt:

sodium aluminate ($Al_2O_3$); sodium silicate ($SiO_2$).

The foregoing water-soluble salts are converted into their oxides or complex oxides and deposited on and carried on the surface of the metal nickel fine particles to give the composite nickel fine powder according to the present invention, by adjusting the pH of the solution of the water-soluble salt as has been discussed above.

If the composite nickel fine powder-production method of the present invention is carried out according to the wet-carrying process, it may further comprise subsequent washing and/or drying steps in addition to the foregoing processing steps. However, the metal oxides and/or complex oxides derived from the foregoing water-soluble salts are carried on the surface of the metal nickel fine particles according to the wet-carrying process, followed by washing and drying and then the metal nickel fine particles on which the oxides and/or complex oxides are carried may be subjected to an additional step such as a treatment with an apparatus such as Angmill (available from HOSOKAWA MICRON CORP. in Japan), Hybridizer (available from Nara Machinery Co., Ltd., in Japan), Mechano-Fusion (available from HOSOKAWA MICRON CORP., in Japan , Coatmizer (available from FREUND INDUSTRIAL Co. Ltd. in Japan), Dispacoat (available from Nisshin Engineering Co., Ltd., in Japan) or Jetmizer (available from Seisin Enterprise Co., Ltd. in Japan), wherein the metal nickel fine particles are collided with each other or with other objects to thus tightly carry the oxides and/or complex oxides on the surface of the metal nickel fine particles.

In the composite nickel fine powder-production method of the present invention carried out according to the dry-carrying process, at least one member selected from the group consisting of ultrafine particles of oxides and complex oxides containing at least one metal element having an atomic number ranging from 12 to 56 or 82 and belonging to Group 2 to 14 of Periodic Table can be temporally carried on the surface of metal nickel fine particles or metal nickel fine particles whose surface is oxidized, followed by colliding the nickel fine particles temporally carrying the ultrafine particles adhered thereto with each other or other objects to thus carry the ultrafine particles on the surface of the metal nickel fine particles.

When the composite nickel fine powder-production method of the present invention is carried out according to the dry-carrying process and the resulting composite nickel fine powder is used in the form of a paste for producing an internal electrode of laminated ceramic condensers, the metal nickel fine particles or the surface-oxidized metal nickel fine particles, which can be used in the method of the invention, preferably have a particle size of not more than 5 $\mu$m and more preferably not more than 1 $\mu$m. Moreover, the smaller the particle size of the ultrafine particles of these oxides and/or complex oxides, the smaller the amount thereof required for uniformly carrying them on the metal nickel fine particles. For this reason, the particle size thereof is preferably not more than 0.5 $\mu$m, more preferably not more than 0.1 $\mu$m and most preferably not more than 0.05 $\mu$m.

To carry the ultrafine particles of the foregoing metal oxides and/or complex oxides on the surface of the metal nickel fine particles or the metal nickel fine particles whose surface is oxidized, it is necessary to mix the former with the latter and then the metal nickel fine particles temporally carrying the ultrafine particles are collided with each other or other objects to thus ensure the adhesion of the ultrafine particles to the surface of the metal nickel fine particles. Alternatively, the metal nickel fine particles and the ultrafine particles of the metal oxides and/or complex oxides are charged in an apparatus such as Angmill, Hybridizer, Mechano-Fusion, Coatmizer, Dispacoat or Jetmizer to thus simultaneously mix and carry the latter on the former.

In the composite nickel fine powder-production method of the present invention carried out according to the semi-dry-carrying process, a suspension containing at least one member dispersed therein and selected from the group consisting of ultrafine particles of oxides and complex oxides containing at least one metal element having an atomic number ranging from 12 to 56 or 82 and belonging to Group 2 to 14 of Periodic Table is mixed, with heating, with metal nickel fine particles or metal nickel fine particles whose surface is oxidized, followed by removing the medium of the suspension to thus temporally carry the ultrafine particles on the surface of the metal nickel fine particles, and colliding the metal nickel fine particles temporally carrying the ultrafine particles adhered thereto with each other or other objects to thus carry the ultrafine particles on the surface of the metal nickel fine particles.

The metal nickel fine particles or the surface-oxidized metal nickel fine particles which may be used in the foregoing semi-dry-carrying process, as well as the ultrafine particles of the metal oxides and/or complex oxides may be identical to those used in the foregoing dry-carrying process. In addition, the medium in which the ultrafine particles are suspended is not restricted to any particular one and commonly used are, for instance, water, an acidic aqueous solution, a basic aqueous solution, an alcohol or other organic solvents. In this production method, the suspension used may be prepared by dispersing ultrafine particles of a desired oxide or complex oxide in a predetermined concentration of solid contents or may be, for instance, commercially available silica sol, alumina sol, titania sol and barium titanate sol, which may, if necessary, be diluted to adjust the concentration thereof to a desired level.

The present invention will hereinafter be described in more detail with reference to the following working Examples, Comparative Examples and Preparation Examples, but the present invention is not restricted to these specific Examples at all.

Comparative Example 1

To pure water, there was dissolved 244 g of solid primary sodium hydroxide and then the resulting solution was diluted with pure water to a total volume of 430 ml to give a sodium hydroxide aqueous solution. On the other hand, 448 g of nickel sulfate ($NiSO_4.6H_2O$; a product having a quality level of 22.2% by weight) was dissolved in pure water (warmed water was used for ensuring immediate and complete dissolution) and then the resulting solution was diluted with pure water to a total volume of 1000 ml to give a nickel sulfate aqueous solution. The resulting nickel sulfate aqueous solution was continuously added to the foregoing sodium hydroxide aqueous solution over 50 minutes at an addition rate of 20 ml/min. After raising the temperature of the hydroxide-containing slurry thus prepared up to 60° C., 420 g of hydrazine monohydrate was added to the slurry at a time to thus reduce the hydroxide. The resulting metal nickel fine particles were washed with pure water, the water-washing was continued till the pH of the wash liquid reached the level of not more than 10, followed by filtration and drying according to the usual method to give metal nickel fine powder. The resulting metal nickel fine particles had an average particle size (Feret's diameter: average particle size of primary particles) of 0.2 $\mu$m as determined by the SEM observation and the surface thereof was found to be microscopically uneven.

Comparative Example 2

Nickel fine powder was prepared by repeating the same procedures used in Comparative Example 1 except that 420 g of the hydrazine monohydrate used for the reduction of the hydroxide-containing slurry heated to 60° C. was continuously added to the slurry over 20 minutes instead of the addition thereof at a time. The resulting metal nickel fine particles had an average particle size (Feret's diameter) of 0.2 $\mu$m as determined by the SEM observation and the surface thereof was found to be microscopically uneven.

Comparative Example 3

Nickel fine powder consisting of the metal nickel fine powder prepared in Comparative Example 1, whose surface was microscopically uneven, was charged to Hybridizer (available from Nara Kikai Seisakusho) and it was processed by circulating it in the machine for 5 minutes at 8000 rpm. The metal nickel fine particles obtained after the treatment had an average particle size (Feret's diameter) of 0.2 $\mu$m as determined by the SEM observation and the surface thereof was found to be smooth.

Comparative Example 4

Nickel fine powder consisting of the metal nickel fine powder prepared in Comparative Example 2, whose surface was microscopically uneven, was charged in Hybridizer (available from Nara Kikai Seisakusho) and it was processed by circulating it in the machine for 5 minutes at 8000 rpm. The metal nickel fine particles obtained after the treatment had an average particle size (Feret's diameter) of 0.5 μm as determined by the SEM observation and the surface thereof was found to be smooth.

Preparation Example 1

To one liter of pure water, there was added 100 g of the metal nickel fine powder prepared in Comparative Example 1, followed by stirring to give a slurry. After stirring the slurry over 30 minutes, 100 g of an aqueous hydrogen peroxide solution was added thereto at a time. The stirring was stopped at an instance when the generation of bubbles was ceased (this indicated the completion of the reaction), followed by filtration and drying to give metal nickel fine powder whose surface was oxidized. The resulting metal nickel fine particles was found to have an average particle size (Feret's diameter) of 0.2 μm as determined by the SEM observation.

Preparation Example 2

To one liter of pure water, there was added 100 g of the metal nickel fine powder prepared in Comparative Example 2, followed by stirring to give a slurry. After stirring the slurry over 30 minutes, 100 g of an aqueous hydrogen peroxide solution was added thereto at a time. The stirring was stopped at an instance when the generation of bubbles was ceased (this indicated the completion of the reaction), followed by filtration and drying to give metal nickel fine powder whose surface was oxidized. The resulting metal nickel fine particles was found to have an average particle size (Feret's diameter) of 0.5 μm as determined by the SEM observation.

EXAMPLE 1

To one liter of pure water, there was added 100 g of the metal nickel fine powder prepared in Preparation Example 1, whose surface was oxidized, followed by stirring to give a slurry, heating the slurry to 60° C. and maintaining the slurry at that temperature. To the slurry, there was added, at a time, 19.2 g of titanium sulfate (product having Ti content of 5% by weight) and the pH value of the mixture was adjusted to 8 by addition of an aqueous sodium hydroxide solution (NaOH: 1N). The stirring was continued under those conditions for one hour, followed by filtration and drying to give composite nickel fine powder carrying $TiO_2$ adhered to the surface of the metal nickel particles.

EXAMPLE 2

To one liter of pure water, there was added 100 g of the surface-oxidized metal nickel fine powder prepared in Preparation Example 2, followed by stirring to give a slurry, heating the slurry to 60° C. and maintaining the slurry at that temperature. To the slurry, there was added, at a time, an aqueous solution prepared by dissolving 5.0 g of chromium chloride in 50 ml of pure water and the pH value of the mixture was adjusted to 7 by addition of an aqueous sodium hydroxide solution (NaOH: 1N). The stirring was continued under those conditions for one hour, followed by filtration and drying to give composite nickel fine powder carrying $Cr_2O_3$ adhered to the surface of the metal nickel particles.

EXAMPLE 3

To one liter of pure water, there was added 100 g of the surface-oxidized metal nickel fine powder prepared in Preparation Example 1, followed by stirring to give a slurry, heating the slurry to 60° C. and maintaining the slurry at that temperature. To the slurry, there was added, at a time, an aqueous solution prepared by dissolving 6.5 g of sodium silicate (water glass) in 60 ml of pure water and the pH value of the mixture was adjusted to 6 by addition of a dilute sulfuric acid. The stirring was continued under those conditions for one hour, followed by filtration and drying to give composite nickel fine powder carrying $SiO_2$ adhered to the surface of the metal nickel particles.

EXAMPLE 4

To one-liter of pure water, there was added 100 g of the surface-oxidized metal nickel fine powder prepared in Preparation Example 1, followed by stirring to give a slurry, heating the slurry to 60° C. and maintaining the slurry at that temperature. To the slurry, there was added, at a time, an aqueous solution prepared by dissolving 3.5 g of yttrium chloride in 50 ml of pure water and the pH value of the mixture was adjusted to 6 by addition of an aqueous sodium hydroxide solution (NaOH: 1N). The stirring was continued under those conditions for one hour, followed by filtration and drying to give composite nickel fine powder carrying $Y_2O_3$ adhered to the surface of the metal nickel particles.

EXAMPLE 5

To one liter of pure water, there was added 100 g of the surface-oxidized metal nickel fine powder prepared in Preparation Example 1, followed by stirring to give a slurry, heating the slurry to 60° C. and maintaining the slurry at that temperature. To the slurry, there was added, at a time, an aqueous solution prepared by dissolving 3.5 g of zirconium chloride oxide in 50 ml of pure water and the pH value of the mixture was adjusted to 6 by addition of an aqueous sodium hydroxide solution (NaOH: 1N). The stirring was continued under those conditions for one hour, followed by filtration and drying to give composite nickel fine powder carrying $ZrO_2$ adhered to the surface of the metal nickel particles.

EXAMPLE 6

To one liter of pure water, there was added 100 g of the surface-oxidized metal nickel fine powder prepared in Preparation Example 1, followed by stirring to give a slurry, heating the slurry to 60° C. and addition of 3.9 g of an aqueous titanium sulfate solution (Ti content: 5% by weight) at a time. Further an aqueous sodium hydroxide solution (NaOH: 1N) was added to the slurry to adjust the pH thereof to 8, followed by stirring it for one hour. Then the slurry was filtered, once repulped and again filtered. The cake thus obtained was added to one liter of pure water to give a slurry. Then there was added, to the slurry, a solution prepared by dissolving 2.62 g of barium chloride in warmed water at a time and the pH value of the mixture was adjusted to not less than 12 by addition of an aqueous sodium hydroxide solution (NaOH: 1N). The stirring was continued under those conditions for one hour, followed by filtration and drying to give composite nickel fine powder carrying $BaTiO_3$ adhered to the surface of the metal nickel particles.

EXAMPLE 7

To one liter of pure water, there was added 100 g of the surface-oxidized metal nickel fine powder prepared in Preparation Example 2, followed by stirring to give a slurry, heating the slurry to 60° C. and maintaining the slurry at that temperature. To the slurry, there was added, at a time, an aqueous solution prepared by dissolving 15.7 g of manganese sulfate in 100 ml of pure water and the pH value of the mixture was adjusted to 8 by addition of an aqueous sodium hydroxide solution (NaOH: 1N). The stirring was continued under those conditions for one hour, followed by filtration and drying to give composite nickel fine powder carrying $MnO_2$ adhered to the surface of the metal nickel particles.

EXAMPLE 8

To one liter of pure water, there was added 100 g of the surface-oxidized metal nickel fine powder prepared in Preparation Example 2, followed by stirring to give a slurry, heating the slurry to 50° C. and maintaining the slurry at that temperature. To the slurry, there was added, at a time, an aqueous solution prepared by dissolving 5.5 g of sodium aluminate in 100 ml of pure water and the pH value of the mixture was adjusted to 8 by addition of a dilute sulfuric acid. The stirring was continued under those conditions for one hour, followed by filtration and drying to give composite nickel fine powder carrying $Al_2O_3$ adhered to the surface of the metal nickel particles.

EXAMPLE 9

To one liter of pure water, there was added 100 g of the surface-oxidized metal nickel fine powder prepared in Preparation Example 2, followed by stirring to give a slurry, heating the slurry to 60° C. and maintaining the slurry at that temperature. To the slurry, there was added, at a time, an aqueous solution prepared by dissolving 10.4 g of gallium nitrate in 100 ml of pure water and the pH value of the mixture was adjusted to 9 by addition of an aqueous sodium hydroxide solution (NaOH: 1N). The stirring was continued under those conditions for one hour, followed by filtration and drying to give composite nickel fine powder carrying $Ga_2O_3$ adhered to the surface of the metal nickel particles.

EXAMPLE 10

To one liter of pure water, there was added 100 g of the surface-oxidized metal nickel fine powder prepared in Preparation Example 2, followed by stirring to give a slurry, heating the slurry to 60° C. and addition of 3.9 g of an aqueous titanium sulfate solution (Ti content: 5% by weight) at a time. Further an aqueous sodium hydroxide solution (NaOH: 1N) was added to the slurry to adjust the pH thereof to 8, followed by stirring for one hour. Then the slurry was filtered, once repulped and again filtered. The cake thus obtained was added to one liter of pure water to give a slurry. Then there was added, to the slurry, a solution prepared by dissolving 2.0 g of strontium chloride in warmed water at a time and the pH value of the mixture was adjusted to not less than 12 by addition of an aqueous sodium hydroxide solution (NaOH: 1N). The stirring was continued under those conditions for one hour, followed by filtration and drying to give composite nickel fine powder carrying $SrTiO_3$ adhered to the surface of the metal nickel particles.

The composite nickel fine powder prepared above in Examples 1 to 10 and the metal nickel fine powder prepared in the foregoing Comparative Examples 1 to 2 were inspected for the rate of thermal shrinkage in a nitrogen gas atmosphere at a heating rate of 10° C./min using a thermomechanical analyzer (TAS-100 available from Rigaku Denki K.K.). The results thus obtained are listed in the following Table 1.

TABLE 1

| Ex. No. | Feret's Diam. ($\mu$m) | Kind of Oxide | Adhered Amount (wt %) | Rate of Thermal Shrinkage (%) | | | |
|---|---|---|---|---|---|---|---|
| | | | | 500° C. | 700° C. | 900° C. | 1100° C. |
| 1 | 0.20 | $TiO_2$ | 0.97 | −0.25 | −0.17 | −1.92 | −7.08 |
| 2 | 0.20 | $Cr_2O_3$ | 0.95 | −1.25 | −2.29 | −6.96 | −11.96 |
| 3 | 0.20 | $SiO_2$ | 0.90 | −0.63 | −0.02 | −0.83 | −3.46 |
| 4 | 0.20 | $Y_2O_3$ | 0.95 | −1.08 | −0.83 | −3.06 | −4.83 |
| 5 | 0.20 | $ZrO_2$ | 0.98 | −0.77 | −0.58 | −6.38 | −11.83 |
| 6 | 0.20 | $BaTiO_3$ | 0.96 | −1.25 | −1.45 | −3.96 | −14.08 |
| 7 | 0.50 | $MnO_2$ | 2.88 | −0.92 | −0.98 | −5.83 | −12.92 |
| 8 | 0.50 | $Al_2O_3$ | 0.89 | −1.35 | −0.98 | −1.46 | −8.04 |
| 9 | 0.50 | $Ga_2O_3$ | 0.88 | −1.28 | −2.17 | −4.52 | −9.58 |
| 10 | 0.50 | $SrTiO_3$ | 0.91 | −1.04 | −1.99 | −2.75 | −5.09 |
| 1* | 0.20 | — | — | −0.83 | −1.98 | −9.69 | −15.35 |
| 2* | 0.50 | — | — | −0.56 | −0.69 | −7.88 | −14.46 |

*Comparative Example

As will be seen from the data listed in Table 1, the composite nickel fine powder of Examples 1 to 10 (present invention) have considerably low rates of thermal shrinkage at high temperatures as compared with the metal nickel fine powder of Comparative Examples 1 to 2.

EXAMPLE 11

There were mixed, with stirring, 500 g of the metal nickel fine powder prepared in Comparative Example 2 and 35 g of ultrafine alumina particles (Aluminum Oxide C available from Nippon Aerosil Co., Ltd.; average particle size of primary particles: 13 nm; mixing rate relative to the metal nickel fine powder: 7% by weight) for 15 minutes to give nickel fine particles comprising the alumina ultrafine particles temporally carried on the surface of the metal nickel fine particles. Moreover, the powder was charged in Hybridizer (available from Nara Kikai Seisakusho) and the powder was processed by circulating it in the machine for 5 minutes at 8000 rpm to thus give composite nickel fine powder comprising the alumina ultrafine particles carried on the surface of the metal nickel fine particles.

Since the alumina ultrafine particles were carried on the surface of the metal nickel fine particles in the resulting composite nickel fine powder, there was not observed any removal and floating of the alumina ultrafine particles even when it was added to water (in case of the powder obtained by simply mixing with stirring, the alumina ultrafine particles were suspended in water and the water got cloudy). In addition, the resulting composite nickel fine powder was inspected through SEM observation and it was confirmed that the alumina ultrafine particles were uniformly carried on the surface of the composite nickel fine particles and that the particle size of the composite particles was almost equivalent before and after the adhesion step.

EXAMPLE 12

The same procedures used in Example 11 were repeated except that 2.5 g of alumina ultrafine particles (mixing rate relative to the metal nickel fine powder: 0.5% by weight) was substituted for 35 g of the alumina ultrafine particles used in Example 11 to give composite nickel fine powder comprising the alumina ultrafine particles carried on the surface of the metal nickel fine particles.

EXAMPLES 13 TO 26

There were mixed, with stirring, 500 g of the metal nickel fine powder prepared in Comparative Example 2 and 25 g (mixing rate relative to the metal nickel fine powder: 5% by weight) or 5 g (mixing rate relative to the metal nickel fine powder: 1% by weight) of ultrafine titanium oxide particles (P25 available from Nippon Aerosil Co., Ltd.; average particle size of primary particles: 13 nm), ultrafine silicon oxide particles (300CF available from Nippon Aerosil Co., Ltd.; average particle size of primary particles: 7 nm), ultrafine magnesium oxide particles (100A available from Ube Material Co., Ltd.; average particle size of primary particles: 10 nm), ultrafine yttrium oxide particles (available from CI Chemical Industries, Ltd.; average particle size of primary particles: 10 nm), ultrafine barium titanate particles (prepared according to the sol-gel method using titanium propoxide and barium propoxide; average particle size of primary particles: 30 nm), ultrafine strontium titanate particles (prepared according to the sol-gel method; average particle size of primary particles: 10 nm) or ultrafine barium strontium titanate $(Ba_{0.9}Sr_{0.1})TiO_3$ particles (prepared according to the sol-gel method; average particle size of primary particles: 10 nm) for 15 minutes to give metal nickel fine particles comprising one of the foregoing ultrafine particles temporally carried on the surface of the metal nickel fine particles. Moreover, the powder was charged in Hybridizer (available from Nara Kikai Seisakusho) and the powder was processed by circulating it in the machine for 5 minutes at 8000 rpm to thus give composite nickel fine powder comprising one of the foregoing ultrafine particles carried on the surface of the metal nickel fine particles.

EXAMPLE 27

The same procedures used in Example 11 were repeated except that Mechano-Fusion was substituted for Hybridizer (available from Nara Kikai Seisakusho) used in Example 11 and that the powder was processed by circulating it in the machine for 30 minutes at 3000 rpm to thus give composite nickel fine powder comprising alumina ultrafine particles carried on the surface of the metal nickel fine particles.

Since the alumina ultrafine particles were carried on the surface of the metal nickel fine particles in the resulting composite nickel fine powder, there was not observed any removal and floating of the alumina ultrafine particles even when it was added to water with stirring. In addition, the resulting composite nickel fine powder was inspected through SEM observation and it was confirmed that the alumina ultrafine particles were uniformly carried on the surface of the composite powder and that the particle size of the composite particles was almost equivalent before and after the adhesion step.

EXAMPLE 28

To 2.5 liter of a solution (silica content: 10 g/l) obtained by diluting silica sol (Snow Tex O, available from Nissan Chemical Industries, Ltd.; average particle size of primary particles: 10 nm) 20 times with water, there was added 500 g of the metal nickel fine powder prepared in Comparative Example 2, followed by sufficient stirring with heating. The water component was gradually evaporated and finally dry powder was obtained. The powder was charged in Hybridizer (available from Nara Kikai Seisakusho) and the powder was processed by circulating it in the machine for 5 minutes at 8000 rpm to thus give composite nickel fine powder comprising the ultrafine silica particles carried on the surface of the metal nickel fine particles.

The resulting composite nickel fine powder was inspected through SEM observation and it was confirmed that the silica ultrafine particles were uniformly carried on the surface of the composite powder and that the particle size of the composite particles was almost equivalent before and after the adhesion step. The amount of the silica particles carried on the surface of the composite nickel fine particles was found to be 5% by weight based on the weight of the metal nickel fine powder. Moreover, the silica ultrafine particles were carried on the surface of the metal nickel fine particles in the resulting composite nickel fine powder and therefore, there was not observed any removal and floating of the silica ultrafine particles even when it was added to water with stirring.

EXAMPLE 29

To a container of Ultradisperser (available from Mitsui Mining Co., Ltd.), there was added 500 g of the metal nickel fine powder prepared in Comparative Example 2 with sufficient stirring, while heating the container with hot steam, followed by dropwise addition, from the top of the container, of alumina sol (125 g; Alumina Sol 520 available from Nissan Chemical Industries, Ltd.; particle size: 10~20 nm) to give metal nickel fine powder comprising alumina ultrafine particles temporally carried on the surface of the metal nickel fine particles. The powder was charged in Hybridizer (available from Nara Kikai Seisakusho) and the powder was processed by circulating it in the machine for 5 minutes at 8000 rpm to thus give composite nickel fine powder comprising the ultrafine alumina particles carried on the surface of the metal nickel fine particles. The resulting composite nickel fine powder was inspected through SEM observation and it was confirmed that the ultrafine particles were carried on the surface of the metal nickel fine particles and that the amount of the ultrafine particles carried on the surface of the metal nickel fine particles was found to be 5% by weight based on the weight of the metal nickel fine powder.

The composite nickel fine powder prepared above in Examples 11 to 29 and the metal nickel fine powder prepared in the foregoing Comparative Exampled 3 to 4, which had smooth surface, but to which any oxide or complex oxide was not adhered were inspected for the rate of the thermal shrinkage in a nitrogen gas atmosphere at a heating rate of 10° C./min using a thermomechanical analyzer (TMA/SS6000 available from Seiko Electronic Industries, Ltd.). The results thus obtained are listed in the following Table 2. In this respect, the rates of thermal shrinkage observed for the metal nickel fine powder prepared in Comparative Examples 1 to 2, which do not have smooth surface and to which any oxide or complex oxide is not adhered, are listed in the foregoing Table 1.

TABLE 2

| Ex. No. | Kind of Oxide | Rate of Mixing (%) | Rate of Thermal Shrinkage (%) | | | |
|---|---|---|---|---|---|---|
| | | | 500° C. | 700° C. | 900° C. | 1100° C. |
| 11 | $Al_2O_3$ | 7 | −0.34 | −0.41 | −0.41 | −0.49 |
| 12 | $Al_2O_3$ | 0.5 | −0.52 | −0.61 | −0.63 | −1.81 |
| 13 | $TiO_2$ | 1 | −0.57 | −0.63 | −2.90 | −8.67 |
| 14 | $TiO_2$ | 5 | −0.49 | −0.54 | −2.41 | −7.97 |
| 15 | $SiO_2$ | 1 | −0.52 | −0.63 | −0.95 | −1.46 |
| 16 | $SiO_2$ | 5 | −0.49 | −0.63 | −0.70 | −1.13 |
| 17 | MgO | 1 | −0.58 | −0.30 | −0.33 | −0.24 |
| 18 | MgO | 5 | −0.55 | −0.35 | −0.39 | −0.28 |
| 19 | $Y_2O_3$ | 1 | −0.32 | −0.48 | −0.53 | −1.87 |
| 20 | $Y_2O_3$ | 5 | −0.45 | −0.49 | −0.58 | −1.52 |
| 21 | $BaTiO_3$ | 1 | −0.48 | −0.51 | −0.68 | −0.69 |
| 22 | $BaTiO_3$ | 5 | −0.51 | −0.52 | −0.63 | −0.66 |
| 23 | $SrTiO_3$ | 1 | −0.38 | −0.44 | −0.81 | −2.14 |
| 24 | $SrTiO_3$ | 5 | −0.32 | −0.39 | −0.52 | −1.90 |
| 25 | $(Ba_{0.9}Sr_{0.1})TiO_3$ | 1 | −0.25 | −0.41 | −0.60 | −1.86 |
| 26 | $(Ba_{0.9}Sr_{0.1})TiO_3$ | 5 | −0.32 | −0.37 | −0.51 | −0.95 |
| 27 | $Al_2O_3$ | 7 | −0.37 | −0.46 | −0.54 | −0.79 |
| 28 | $SiO_2$ | 5 | −0.26 | −0.36 | −0.59 | −0.80 |
| 29 | $Al_2O_3$ | 5 | −0.43 | −0.46 | −0.56 | −0.59 |
| 3* | — | — | −0.81 | −1.94 | −9.56 | −15.08 |
| 4* | — | — | −0.54 | −0.66 | −7.79 | −14.30 |

*Comparative Example

As will be clear from the data listed in Tables 1 and 2, the composite nickel fine powder of Examples 11 to 29 (present invention) have considerably low rates of thermal shrinkage at high temperatures as compared with the metal nickel fine powder of Comparative Examples 1 to 4.

The composite nickel fine powder obtained in Examples 11 to 26 and the metal nickel fine powder of Comparative Examples 2 and 4 were subjected to thermogravimetric analysis in the air. More specifically, the weight of each sample was determined prior to the analysis, then the sample was heated up to 400° C. at a rate of 10° C./min and maintained at 400° C. for 2 hours. At this stage, the weight of each sample was determined to thus calculate the rate A (%) of weight gain relative to the weight observed at the beginning of the measurement (initial weight). Thereafter, the temperature of the sample was raised up to 1000° C. (at this stage, all of the nickel was seemed to be converted into nickel oxide), the weight of each sample was determined at this stage to thus obtain the rate B (%) of weight gain relative to the initial weight. The ratio, A/B was determined, which was defined to be the degree of oxidation of each sample (i.e., nickel powder) after maintaining it at 400° C. for 2 hours. The results thus obtained are summarized in Table 3 given below.

TABLE 3

| Ex. No. | Kind of Oxide | Rate of Mixing | Deg. of Oxidation After Maintaining Each Sample at 400° C. for 2 hours (%) |
|---|---|---|---|
| 11 | $Al_2O_3$ | 7% | 52 |
| 12 | $Al_2O_3$ | 0.5% | 65 |
| 13 | $TiO_2$ | 1% | 78 |
| 14 | $TiO_2$ | 5% | 69 |
| 15 | $SiO_2$ | 1% | 69 |
| 16 | $SiO_2$ | 5% | 58 |

TABLE 3-continued

| Ex. No. | Kind of Oxide | Rate of Mixing | Deg. of Oxidation After Maintaining Each Sample at 400° C. for 2 hours (%) |
|---|---|---|---|
| 17 | MgO | 1% | 81 |
| 18 | MgO | 5% | 63 |
| 19 | $Y_2O_3$ | 1% | 70 |
| 20 | $Y_2O_3$ | 5% | 61 |
| 21 | $BaTiO_3$ | 1% | 53 |
| 22 | $BaTiO_3$ | 5% | 49 |
| 23 | $SrTiO_3$ | 1% | 57 |
| 24 | $SrTiO_3$ | 5% | 55 |
| 25 | $(Ba_{0.9}Sr_{0.1})TiO_3$ | 1% | 63 |
| 26 | $(Ba_{0.9}Sr_{0.1})TiO_3$ | 5% | 59 |
| 2* | — | — | 83 |
| 4* | — | — | 83 |

*Comparative Example

The data listed in Table 3 clearly indicate that the composite nickel fine powder of Examples 11 to 26 according to the present invention are excellent in resistance to oxidation as compared with the metal nickel powder of Comparative Examples 2 and 4. In particular, it is clear that the higher the rate of the oxide and/or complex oxide carried on the nickel surface, the higher the resistance to acids of the composite nickel fine powder. This would be because the oxide and/or complex oxide carried on the surface of the nickel fine powder show an effect of protecting the composite nickel fine powder from oxidation.

Further the composite nickel fine powder obtained in the foregoing Example 11 and the metal nickel fine powder of Comparative Example 4 were subjected to thermogravimetric analysis. After determining the weight of each sample, the sample was heated up to 1000° C. at a heating rate of 1.5° C./min and the rates of weight gain thus determined were plotted as a function of the temperature. Thus, the temperature at which the rate of weight gain reached a half of that observed at 1000° C. was determined. This means the temperature at which 50% of the nickel is oxidized. This temperature was found to be 429° C. for the metal nickel powder of Comparative Example 4, while that for the composite nickel fine powder obtained in the foregoing Example 11 was found to be 452° C. and this indicates that the temperature required for oxidizing 50% of the nickel is increased by 23° C.

As has been described above in detail, the composite nickel fine powder of the present invention is excellent in resistance to oxidation, has a structure less sensitive to oxidation, the rapid thermal large-sized-initiating temperature thereof is shifted to not less than 700° C. and not less than 900° C. for most of the cases tested and therefore, the composite powder is quite suitably used as a material for forming an internal electrode of laminated condensers. In other words, the composite nickel fine powder of the present invention is excellent in resistance to oxidation of metal nickel and resistance to diffusion of nickel oxide during the binder-removal step, shows thermal shrinkage properties approximately corresponding to the thermal shrinkage curve of the ceramic substrate, can accordingly prevent the occurrence of delamination and the formation of cracks when manufacturing a large-sized laminated ceramic condenser, and permits the production of a thin, small-sized multilayered ceramic condenser comprising ceramic dielectric layers and internal electrodes, without impairing the dielectric characteristics and electric properties thereof.

What is claimed is:

1. A method for preparing composite nickel fine powder comprising the steps of:

adding an aqueous solution containing at least one member selected from the group consisting of water-soluble salts of metal elements each having an atomic number of 82 or ranging from 12 to 56 and belonging to Group 2 to 14 of the Periodic Table to a slurry containing metal nickel fine particles or metal nickel fine particles whose surface is oxidized; then adjusting the pH of the mixture with an acid or an alkali to thus temporarily carry the metal oxide and/or the metal complex oxide derived from the water-soluble salt on the surface of the metal nickel fine particles; washing and drying the particles to obtain dry particles; and colliding the dry metal nickel fine particles carrying the metal oxide and/or the metal complex oxide adhered thereto with each other or other objects to thus carry the metal oxide and/or the metal complex oxide on the surface of the metal nickel fine particles.

2. A method for preparing composite nickel fine powder comprising the steps of:

temporarily carrying at least one member selected from the group consisting of ultrafine particles of oxides and complex oxides containing at least one metal element having an atomic number of 82 or ranging from 12 to 56 and belonging to Group 2 to 14 of the Periodic Table to the surface of metal nickel fine particles or metal nickel fine particles whose surface is oxidized and colliding in a dry state the nickel fine particles temporarily carrying the ultrafine particles adhered thereto with each other or other objects to thus carry the ultrafine particles on the surface of the metal nickel fine particles.

3. A method for preparing composite nickel fine powder comprising the steps of:

mixing, with heating, a suspension containing at least one member dispersed therein and selected from the group consisting of ultrafine particles of oxides and complex oxides containing at least one metal element having an atomic number of 82 or ranging from 12 to 56 and belonging to Group 2 to 14 of Periodic Table with metal nickel fine particles or metal nickel fine particles whose surface is oxidized;

removing the medium of the suspension to thus temporarily carry the ultrafine particles on the surface of the metal nickel fine particles; and colliding the nickel fine particles temporarily carrying the ultrafine particles adhered thereto with each other or other objects to thus carry the ultrafine particles on the surface of the metal nickel fine particles.

* * * * *